(No Model.) 3 Sheets—Sheet 1.

T. J. HOWE, D. J. AMES & H. N. LABARE.
COMBINED CHURN AND BUTTER WORKER.

No. 585,100. Patented June 22, 1897.

WITNESSES:

INVENTORS
Thomas J. Howe.
David J. Ames.
Henry N. Labare.
BY
Louis Freser & Co.
ATTORNEYS (No Model.) 3 Sheets—Sheet 2.
T. J. HOWE, D. J. AMES & H. N. LABARE.
COMBINED CHURN AND BUTTER WORKER.
No. 585,100. Patented June 22, 1897.
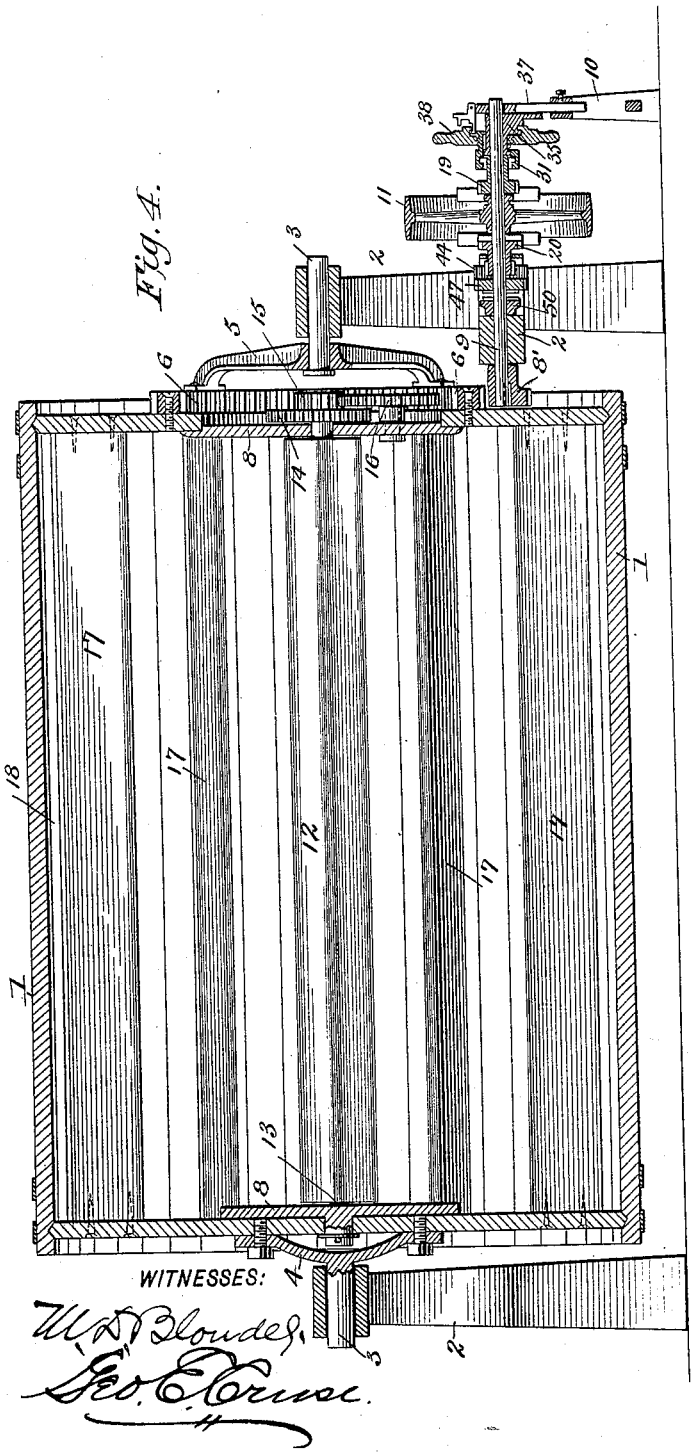
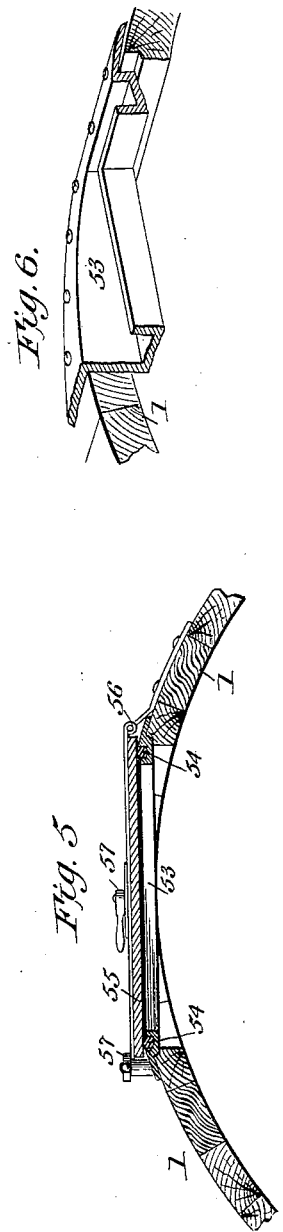
WITNESSES:
INVENTORS
Thomas J. Howe.
David J. Ames.
Henry N. Labare.
BY
ATTORNEYS (No Model.) 3 Sheets—Sheet 3.
T. J. HOWE, D. J. AMES & H. N. LABARE.
COMBINED CHURN AND BUTTER WORKER.
No. 585,100. Patented June 22, 1897.
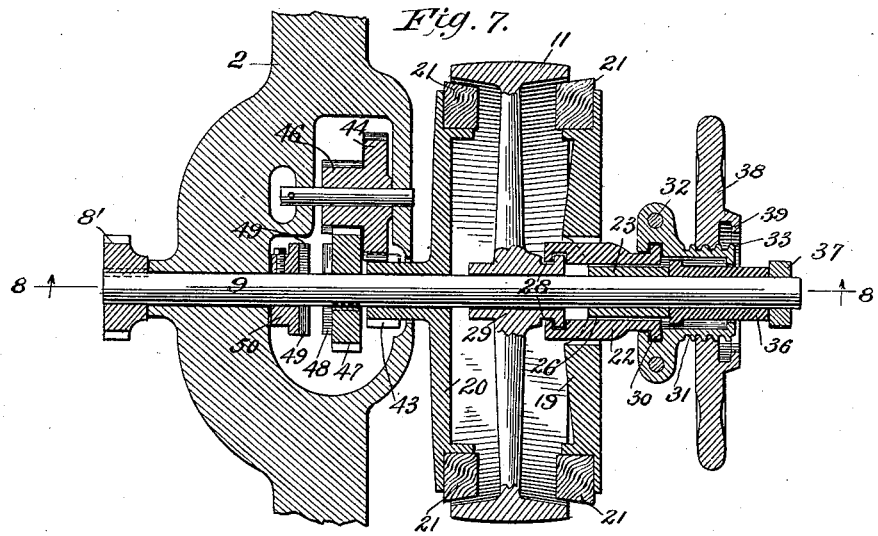
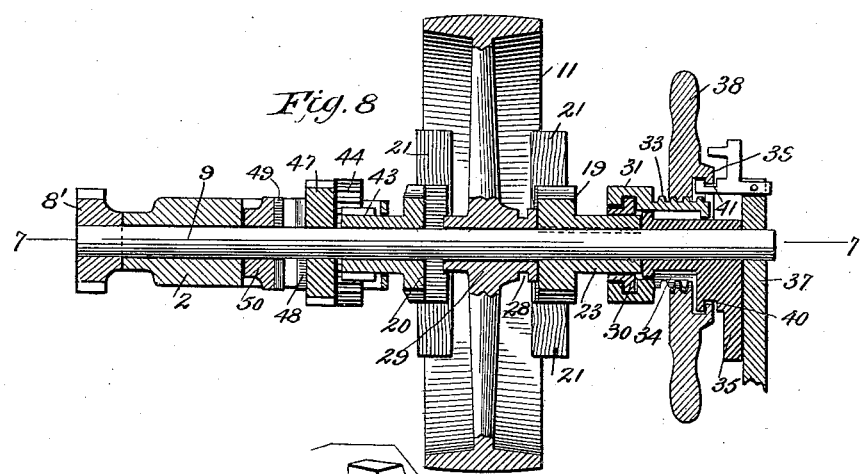
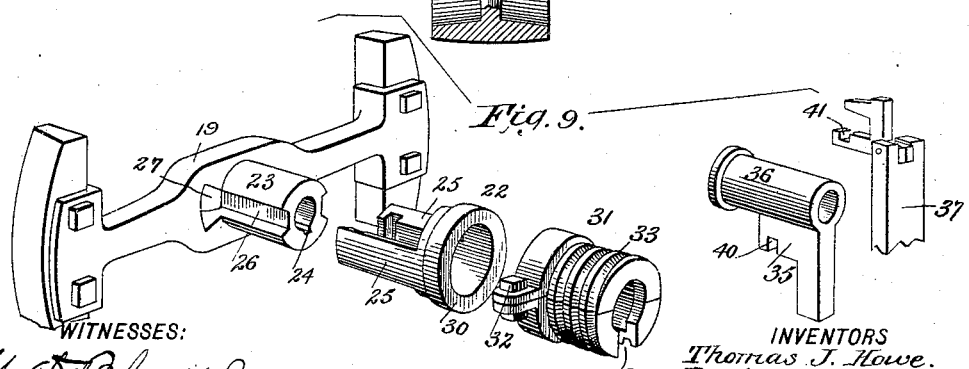
WITNESSES:
INVENTORS
Thomas J. Howe.
David J. Ames.
Henry N. Labare.
BY
ATTORNEYS

UNITED STATES PATENT OFFICE.

THOMAS JEFFERSON HOWE, DAVID JACKSON AMES, AND HENRY NEWTON LABARE, OF OWATONNA, MINNESOTA.

COMBINED CHURN AND BUTTER-WORKER.

SPECIFICATION forming part of Letters Patent No. 585,100, dated June 22, 1897.

Application filed December 28, 1894. Serial No. 533,221. (No model.)

*To all whom it may concern:*

Be it known that we, THOMAS JEFFERSON HOWE, DAVID JACKSON AMES, and HENRY NEWTON LABARE, citizens of the United States, residing at Owatonna, in the county of Steel and State of Minnesota, have invented certain new and useful Improvements in a Combined Churn and Butter-Worker, of which the following is a full, clear, and exact description.

Our invention relates to improvements in combined churns and butter-workers whereby the quality of the butter produced is greatly enhanced.

Our invention consists, broadly, of a suitable cylinder provided on its interior with a number of carriers or flights, of a pair of cylindrical paddles located within the casing and mounted in an independent head which may be clamped to the cylinder when it is desired to have the paddles rotate with the cylinder, and of suitable mechanism connected therewith for rotating the cylinder at variable speeds; and our invention further consists of certain features of new and useful construction that will be hereinafter fully described, and specifically pointed out in the claims.

In order that our invention may be fully understood, we will now proceed to describe the same with reference to the accompanying drawings, in which—

Figure 1:
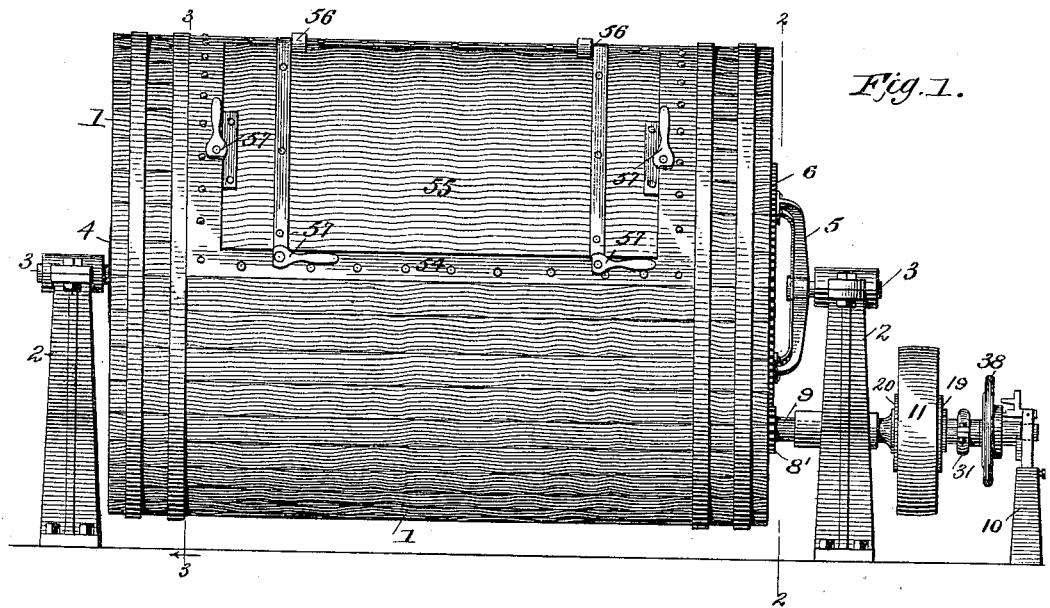
Figure 2:
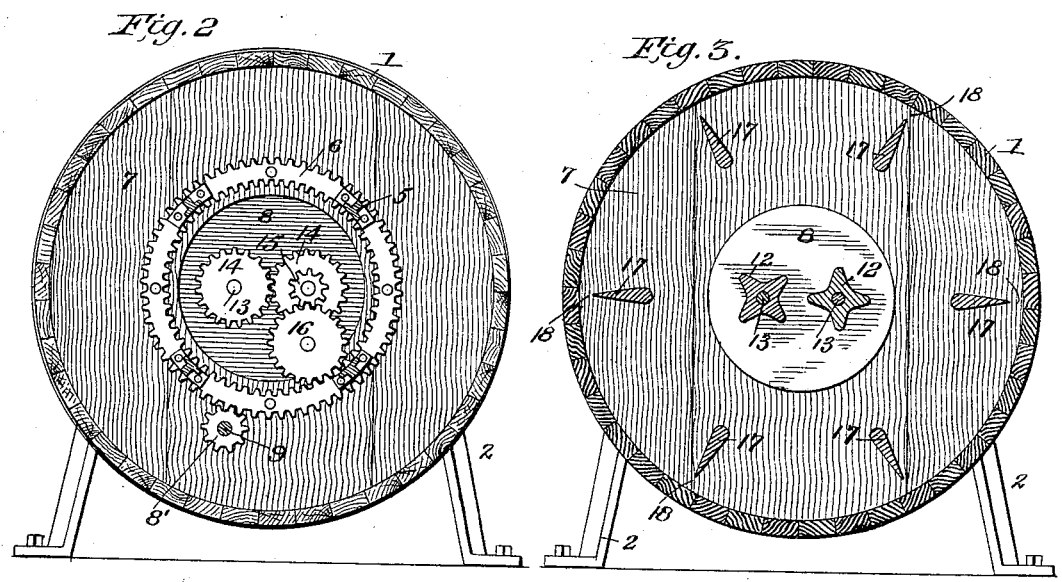
Figure 3:
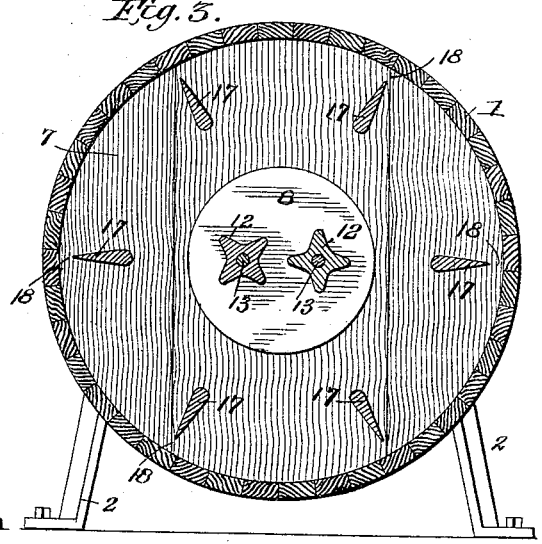

Figure 1 is a side elevation of a combined churn and butter-worker embodying our improvements. Fig. 2 is a cross-sectional view taken on the line II II, Fig. 1. Fig. 3 is also a cross-sectional view taken on the line III III, Fig. 1. Fig. 4 is a vertical section of the device. Fig. 5 is a detail sectional view of a portion of the cylinder and showing the manner of securing the door thereto. Fig. 6 is a detail perspective view of the door-frame. Fig. 7 is an enlarged horizontal sectional view of the variable-speed mechanism, taken on line VII VII, Fig. 8. Fig. 8 is a vertical sectional view of the same, taken on line VIII VIII, Fig. 7. Fig. 9 is a detached perspective view of several parts of the mechanism shown in Figs. 7 and 8.

In said drawings, 1 represents the cylinder of our machine, which is journaled in the standards 2 by means of the short shafts 3, secured to the cylinder 1 at one end by a bracket 4 and at its other end by a bracket 5, which is attached to the gear-wheel 6 of the gearing located on the cylinder. Each end of the cylinder 1 is provided with a head 7, formed with central openings which are closed by means of independent heads 8. These independent heads are designed to be clamped to the cylinder-head 7 by any suitable means, (not shown,) such, for example, as a frictional contact between the heads, which may be produced by a screw passing through collars fitted in the said heads, when it is desired to use the device as a churn, and when the device is to be used as a butter-worker they remain stationary, while the cylinder is revolved about them.

Secured to the head 7 at one end of the cylinder is an externally and internally toothed wheel 6, which is adapted to be driven by means of the pinion 8', mounted on a drive-shaft 9, journaled in the standard 2 and short standard 10. This shaft has loosely journaled on it a pulley 11, which is adapted to be moved into engagement with a variable-speed mechanism to be hereinafter described.

Located within the cylinder 1 and extending the whole length thereof are a pair of cylindrical paddles 12, mounted on shafts 13, which are journaled in the independent heads 8. These paddles are constructed as shown—that is, cross or star shape in cross-section—and are so arranged as to leave a space between them and have an edge on one of the paddles, so as to be opposite an interdental space on the other, so that as the paddles revolve they act on the butter alternately, producing, as it were, a wave motion to the line of butter passing between them. By this it will be seen that the butter is squeezed instead of being rubbed, as would be the case if rolls were used, and squeezing the butter instead of rubbing it saves the grain, which is necessary to good butter. This very desirable result cannot be obtained by using rolls. These shafts 13 are provided, as shown, with intermeshing gear-wheels 14 of the same size, and one of the gear-wheels 14 is provided on its face with a pinion 15, which is engaged by a gear-wheel 16, also in engagement with the internal teeth of the wheel 6. Thus when the gear-wheel 6 is rotated the paddles 12 are evenly driven by the intermeshing gear-wheels, but at a different rate of speed than the cylinder, owing to the arrangement of the gear-wheels. This is an important feature in our invention, as it enables the speed of the paddles and the speed of the cylinder to be so proportioned in relation to each other that the paddles will take the butter through between them as fast as it is brought up by the flights in the cylinder. If the butter is brought up faster than the paddles can take care of it, a part of the butter remaining on top of the paddles is rubbed by the paddles revolving under the butter, thereby injuring the grain of the same. If the butter is not brought up fast enough, it will be unevenly worked.

17 represents a number of flights or carriers placed within the cylinder 1 and extending the whole length thereof. These flights or carriers are wedge-shaped in cross-section and taper to almost a knife-edge. They are arranged in the cylinder so as to have a space 18 between the knife-edge and the cylinder. By this construction and arrangement when the device is used as a churn a great deal of cream passes through the space 18, and in this manner the cream is equally churned throughout and all the butter separated from the buttermilk at the same time and leaving no half-churned cream and no butter that is churned too much, and, moreover, when the device is being used to work butter as the flights carry it upward the buttermilk is allowed to pass through these spaces, and it carries with it particles of butter that may be sticking to the flights or cylinders to the mass of butter in the bottom of the churn, when it is again conveyed upward and thoroughly worked. This would not, however, be the case if the flights were placed close to the cylinder either in churning or working the butter.

We will now proceed to describe the variable-speed mechanism shown in Figs. 4, 7, 8, and 9, by which the device may be driven at either a fast or a slow rate of speed, as may be desired.

11 represents a pulley loosely journaled on the shaft 9, which has its bearings in the standards 2 and 10. 19 and 20 represent clutch-arms, one of which, 19, is rigidly secured on the shaft 9, and the other, 20, is loosely mounted on the shaft. These clutch-arms are provided on their outer ends with blocks 21, adapted to have frictional contact with the pulley 11 when moved into engagement therewith.

When it is desired to have the device revolved at a fast rate of speed, as when churning, the pulley 11 is drawn into engagement with the clutch 19, which is rigidly mounted on the shaft 9. This is accomplished by the following means: 22 represents a collar loosely mounted on the shaft 9 and provided with the dogs which fit in grooves 26, formed in the collar 23, and, passing through the openings 27, formed in the clutch-arm 19, fit in a groove 28, formed in the hub 29 of the pulley 11, in order to make a turning connection therewith and not interfere with the rotation of the pulley. Fitting loosely over the flanged end 30 of the collar 22, so as to permit the collar to rotate therein, is a sleeve 31, formed in two parts and secured together by bolts 32. This collar is formed with an external screw-thread 33 and a slot or opening 34 to allow the square key portion 35 of the abutting sleeve 36 to fit therein, which prevents the said collar from rotating. This abutting sleeve 36 is loosely mounted on the shaft 9, and it abuts against the collar 23 of the clutch-arm 19 and is held in engagement therewith by the bearing-rod 37, carried by the short standard 10. This abutting sleeve 36 has turning connection with a hand-wheel 38, which is provided with a flange 39, fitting in a groove 40, formed in the projection 35 of the abutment-sleeve 36, and in a projection 41, detachably secured thereto. This construction is to permit of a turning of the hand-wheel 38 on the sleeve 31, but prevent any longitudinal movement of said sleeve.

The operation of the above-described construction, which is to draw the pulley 11 into engagement with the clutch 19 in order that the shaft 9 may be rapidly rotated and through the medium of the pinion 8 thereon revolve the cylinder, is as follows: The hand-wheel 38 is turned so that the collar 31 is drawn to the right, which, through connection of the sleeve 31 with the collar 22 and the collar 22 with the pulley 11, is drawn to the right and into engagement with the clutch 19, which, being rigidly mounted on the shaft 9, will rotate it. When, however, the machine is to be stopped, the hand-wheel is turned in a reverse direction, which moves the pulley to the position shown in Fig. 7. When it is desired to have a slow motion of the device, the pulley 11 is moved to the left and forced into engagement with the loose clutch 20, which through a reducing mechanism allows the device to be rotated at a slow rate of speed. This reducing or slow-speed mechanism is arranged as follows: The clutch 20, which is loosely mounted on the shaft 9, is provided with a pinion 43, formed on the hub of the clutch and in engagement with a cog-wheel 44, rigidly mounted on the shaft which has its bearings in the standards 2. Secured to the face of the cog-wheel 44 is a pinion 46, of smaller diameter than the cog-wheel 44, and this pinion is in engagement with a cog-wheel 47, of much larger diameter, loosely mounted on the shaft 9. 48 represents projections on the face of the cog-wheel 47, which when the cog-wheel is pushed to the left by the loose clutch, being moved in that direction by the hand-wheel and connecting parts, are made to engage with a similar projection 49 on a pinion 50, rigidly secured to the shaft 9. Thus when the pulley 11 is moved into engagement with the clutch 20 the cog 47, with projection 48, is moved into engagement with the projections 49 on the pinion 50, which is rigidly secured on the shaft 9. Motion, therefore, will be given to the pinion 50 through the intermediate gearing, which, as will be seen from the arrangement shown, will be slow.

Thus it will be seen from the above description that we have provided a device that can readily and with appropriate speed be used for either churning or butter-working purposes and through the arrangement of the several parts produce a better quality of butter than heretofore.

In Figs. 5 and 6 we have shown a novel and effective arrangement for securing the door to the opening in the cylinder through which the cream is introduced. Secured in the opening of the cylinder 1 is a grooved frame 53, which, as will be seen, is not made to conform to the shape of the cylinder, but to rest easily therein. This groove is filled with a suitable packing 54 to make an even surface on which the door 55 rests. The door 55 is hinged at 56 to the cylinder and is secured in place on the packing by means of the cam-locks 57 or any other means secured to the flange of grooved frame 53. By this arrangement a perfect-fitting cover can be made for the cylinder and overcome the objectionable features incident to the curved door.

Having thus described our invention, the following is what we claim as new therein and desire to secure by Letters Patent:

1. In a combined churn and butter-worker, the combination of a suitable cylinder, means connected therewith for rotating it, and flights or carriers, wedge-shaped in cross-section located in said cylinder and arranged so as to have a space between them and the cylinder, substantially as and for the purpose set forth.

2. In a combined churn and butter-worker, the combination of a suitable cylinder, means connected therewith for rotating it, and a pair of cylindrical paddles located within the cylinder, and arranged to have a space between them and to have the blades on one of the paddles opposite but not entering an interdental space on the other as and for the purpose set forth.

3. In a combined churn and butter-worker the combination of a cylinder, a pair of rolls located therein and means connected with the cylinder and rolls for revolving the cylinder and rolls at different rates of speed, substantially as and for the purpose set forth.

4. In a combined churn and butter-worker the combination of a cylinder having a cog-wheel secured thereto, suitable means in connection therewith for rotating it, a pair of rolls mounted within said cylinder and provided with cog-wheels, a pinion on one of said cog-wheels, and an intermediate cog-wheel between the cog-wheel on the cylinder and the pinion, substantially as and for the purpose set forth.

5. In a combined churn and butter-worker, the combination of a suitable cylinder, means in connection therewith for rotating the cylinder, and suitable mechanism in connection therewith for producing variable speed, substantially as and for the purpose set forth.

6. In a combined churn and butter-worker the combination of a suitable cylinder, means connected therewith for rotating said cylinder at different speeds, consisting of a cog-wheel secured to the cylinder, a pinion rigidly mounted on a driving-shaft and in engagement with said cog-wheel, a pulley loosely mounted on said shaft, a rigid and a loose clutch also mounted on said shaft, a reducing mechanism connected with the loose clutch and suitable means for moving the pulley into engagement with either of the clutches, substantially as and for the purpose set forth.

7. The combination of a suitable cylinder, having a cog-wheel connected thereto, a pinion rigidly mounted on a driving-shaft in engagement with said cog-wheel, a loose pulley mounted on said shaft, a clutch rigidly mounted on said shaft, and suitable means for drawing the pulley into engagement with the clutches, consisting of a collar having a pair of dogs in engagement with the pulley, a sleeve provided with an external screw-thread surrounding said collar, an abutting collar in engagement with said sleeve, and a hand-wheel having a turning connection with the abutment-collar and working on the screw-threaded sleeve, substantially as and for the purpose set forth.

8. The combination of a suitable cylinder, having a cog-wheel secured thereto, a pinion in engagement with said wheel and rigidly mounted on a drive-shaft, a loose pulley mounted on said shaft, a clutch also loosely mounted on said drive-shaft, a speed-reducing mechanism in connection with said clutch consisting of a pinion formed on the hub of the clutch, a cog-wheel mounted on the frame and of larger diameter than the pinion in engagement therewith and having a pinion of smaller diameter secured thereto, a cog-wheel of larger diameter loosely mounted on the shaft carrying the driving-pinion and provided with projections on its face and a cog-wheel rigidly mounted on the drive-shaft and provided with projections with which the projections of the loose cog-wheel engage, and suitable means for moving the pulley into engagement with the clutches substantially as shown and described.

9. The combination, of the wooden drum formed of a series of staves and having an opening in its side or peripheral wall, with a polygonal metallic frame fitting said opening, and having curved ends whereto the staves at the ends of said opening are fastened, said frame having a flat ledge not lower than the straight inner edges of said frame, at the sides thereof, and a door fitting upon said ledge to close the opening, substantially as described.

10. The combination, in a churn, of the drum, with a rectangular frame provided in the peripheral wall thereof, and having curved ends whereto the staves are attached, said frame having a flat ledge, and a door fitting said ledge between the ends of the frame and overlapping the sides of the frame, and means for securing the said door upon said flat ledge, substantially as described.

11. The combination, of the wooden drum formed of a series of staves and having an opening in its side or peripheral wall, with a metallic frame fitting said opening and having curved ends whereto the staves at the ends of the said opening are fastened, said frame having a flat ledge and a door fitting the same between the ends of said metallic frame and overlapping the sides of said metallic frame, substantially as described.

In testimony whereof we have hereunto set our hands in presence of two subscribing witnesses.

THOMAS JEFFERSON HOWE.
  DAVID JACKSON AMES.
  HENRY NEWTON LABARE.

Witnesses:
 LEWIS L. WHEELOCK,
 C. E. RICE.